United States Patent

Colaiano

Patent Number: 5,785,845
Date of Patent: Jul. 28, 1998

[54] WATER PURIFYING SYSTEM

[76] Inventor: Robert Colaiano, 1140 Yuma, Denver, Colo. 80204

[21] Appl. No.: 556,091

[22] Filed: Nov. 9, 1995

[51] Int. Cl.$^6$ .................... C02F 1/32; C02F 1/72
[52] U.S. Cl. .................... 210/167; 210/169; 210/172; 210/192; 210/202; 210/748; 250/436; 250/438
[58] Field of Search .................... 210/169, 172, 210/192, 202, 205, 220, 257.1, 258, 259, 748, 759, 760, 167; 250/436, 437, 438

[56] References Cited

U.S. PATENT DOCUMENTS

| | | | |
|---|---|---|---|
| 1,670,217 | 5/1928 | Scheidt | 250/438 |
| 2,338,388 | 1/1944 | Whitman | 250/436 |
| 2,501,290 | 3/1950 | Pequignot | 250/436 |
| 4,156,652 | 5/1979 | Wiest | 210/760 |
| 4,189,363 | 2/1980 | Beitzel | 250/527 |
| 4,255,663 | 3/1981 | Lewis | 250/438 |
| 4,752,401 | 6/1988 | Bodenstein | 210/760 |
| 4,792,407 | 12/1988 | Zeff et al. | 210/760 |
| 4,798,702 | 1/1989 | Tucker | 250/437 |
| 4,857,204 | 8/1989 | Joklik | 210/748 |
| 4,968,437 | 11/1990 | Noll et al. | 210/748 |
| 5,069,885 | 12/1991 | Ritchie | 210/748 |
| 5,126,111 | 6/1992 | Al-Ekabi et al. | 210/748 |
| 5,174,904 | 12/1992 | Smith, II | 210/759 |
| 5,471,063 | 11/1995 | Hayes et al. | 250/436 |

*Primary Examiner*—Christopher Upton

[57] ABSTRACT

The present invention relates to a water purifying system having hydrogen peroxide added therein which utilizes an improved UV lighting system with a baffle functioning to increase the exposure of microorganisms and molecular hydrogen peroxide to the UV irradiation. The increased exposure increases the kill rate and overall disinfecting capability of the system. In addition an ozonator can be utilized in combination with the improved UV lighting system which still further increases disinfecting efficiency.

6 Claims, 6 Drawing Sheets

WATER PURIFYING SYSTEM

BACKGROUND OF THE INVENTION

1. Field of the Invention

The present invention relates to water purifying system. More particularly, the present invention relates to a water purifying system utilizing hydrogen peroxide a means to convert hydrogen peroxide into ozone and water.

2. Description of the Prior Art

Treating water with gaseous ozone for disinfection is well known in the art. Similarly, treating water with ultraviolet light is also well known in the art. In addition, treating water with an ozone producing apparatus which produces ozone from water is well known in the art. However, the prior art lacks efficiency of disinfecting and currently a low kill rate of microorganisms. The addition of hydrogen peroxide in conjunction with an ozonator and/or in conjunction with an improved UV lighting system increases the kill rate of microorganisms considerably.

Numerous innovations for water purifying systems have been provided in the prior art that are described as follows. Even though these innovations may be suitable for the specific individual purposes to which they address, they differ from the present invention as hereinafter contrasted.

In U.S. Pat. No. 5,384,032, dated, Jan. 24, 1995, titled, WATER PURIFYING AND STERILIZING APPARATUS, invented by De Souza comprises a water purifying and sterilizing apparatus including a box (1) within which three filtering chambers are provided, one of which (4) containing resin as a filtering element within its interior, the other (5) with charcoal as a filtering element within its interior, while the third (6) carries within an ultraviolet lamp (8) with said chamber (6) being provided with a flow baffle (13), comprised of a circular part (14) centrally provided with a circular orifice (15) that surrounds the said lamp (8), being made up of U shaped sections (16), interconnected by ramps (17) describing rectangular openings (18) for water to flow through.

The above patented invention differs from the present invention because the UV lighting system lacks a baffle, hydrogen peroxide and the entire system lacks an ozonator.

In U.S. Pat. No. 5,232,582, dated, Aug. 3, 1993, titled, WATER PURIFYING APPARATUS HAVING MOSS PREVENTING FILTER AND MONITORED AIR INJECTION, invented by Takahshi et al, comprises a water purifying apparatus has feeding device for feeding water under pressure; a bacteria culturing tank; and air supply device for feeding air to the bacteria culturing tamk by inducing air by utilizing fluid energy of circulating water, and an air flow detector provided on an air suction duct of the air supply means. A filter provided upstrem of the feeding means for feeding water under pressure has the capability of preventing moss from growing in a water tank and sterilizing water. An ultraviolet lamp for sterilizing the water in a water tank is provided in a circulating duct. A carrier for fixing bacteria which grows aerobic and anaerobic bacteria is composed of a basic mineral material.

The above patented invention differs from the present invention because the UV lighting system lacks a baffle, lacks hydrogen peroxide and the entire system lacks an ozonator.

In U.S. Pat. No. 4,471,225, dated, Sep. 11, 1984, titled, ULTRAVIOLET APPARATUS FOR DISINFECTION AND STERILIZATION OF FLUIDS, invented by Hillman, comprises an ultraviolet sterilization and disinfection system for fluids which includes apparatus for sensing selected operating characteristics such as physical characteristics of the fluid to be disinfected or sterilized and the operating conditions of the ultraviolet sources proportioning these variable and generally non linear parameters and modifying such factors as fluid flow, ultrviolet energy imparted to the fluid to insure destruction of selected organisms without the use of excessive energy. Control may also be provided for the admission of selected quantities of disinfecting chemicals such as chlorine to the fluid.

The above patented invention differs from the present invention because the UV lighting system lacks a baffle, lacks an indicator and the entire system lacks an ozonator.

In U.S. Pat. No. 4,400,270, dated, Aug. 23, 1983, titled, ULTRAVIOLET APPARATUS FOR DISINFECTION AND STERILIZATION OF FLUIDS, invented by Hillman, comprises an ultraviolet sterilization and disinfection system for fluids which includes apparatus for sensing selected operating characteristics such as physical characteristics of the fluid to be disinfected or sterilized and the operating conditions of the ultraviolet sources proportioning these variable and generally non linear parameters and modifying such factors as fluid flow, ultrviolet energy imparted to the fluid to insure destruction of selected organisms without the use of excessive energy. Control may also be provided for the admission of selected quantities of disinfecting chemicals such as chlorine to the fluid.

The above patented invention differs from the present invention because the UV lighting system lacks a baffle, lacks hydrogen peroxide, lacks an indicator and the entire system lacks an ozonator.

In 5,266,215, dated, Nov. 30, 1993, titled, WATER PURIFICATION UNIT, invented by Engelhard, comprises water to be purified swirls about a source of ultraviolet radiation to kill any microorganisms contained therin and flows through a carbon filter cartridge mounted about the ultraviolet source to remove any chlorine and particulate matter. The outflow from the carbon filter is again subjected to ultraviolet radiation to kill any microorganisms entrained in the water emanating from the carbon filter. An ozone generator may be incorporated to entrain ozone with the inflowing water to enhance killing of any microorganisms present and to oxidize any undesirable compounds.

The above patented invention differs from the present invention because the UV lighting system lacks a baffle, lacks hydrogen peroxide and lacks an indicator.

In U.S. Pat. No. 5,190,669, dated, Mar. 2, 1993, titled, PURIFICATION OF WASTE STREAMS, invented by Weibel is a process for decreasing the concentration of a lignin containing organic carbon in an aqueous system by a combination of ozone and hydrogen peroxide. The process is particularly useful for decolorizing lignin containing aqueous solutions such as effluents from a pulp mill.

The above patented invention differs from the present invention because the UV lighting system lacks a baffle and an indicator.

In U.S. Pat. No. 5,352,369, dated, Oct. 4, 1994, titled, METHOD OF TREATING WATER, invented by Heinig, Jr., comprises a method of treating water to kill bacteria therein includes exposing the water to a silver catalyst in the presence of wxygen to form an active oxidizer formed is predominantly hydrogen peroxide, whereas in a second form of the method an oxidizable salt is added to the water so that the active oxidizer formed is predominantly oxidized ions of the salt. The method can be effectively carried out by adding oxygen in the form of O2 ozone to the water prior to exposing it to the catalyst.

The above patented invention differs from the present invention because the UV lighting system lacks a baffle, lacks added hydrogen peroxide, lacks an indicator and the entire system lacks an ozonator.

In U.S. Pat. No. 4,336,456, dated, Jun. 22, 1982, titled, DEVICE FOR THE STERILIZATION OF LIQUIDS BY MEANS OF ULTRAVIOLET RAYS, invented by Kuse et al., comprises a device for the sterilization of liquids by menas of ultraviolet radiation whereby a low pressure high current mercury vapor lamp is used with a discharge tube as the radiation source wherein the cooling of the lamp is effected by means of an air flow circulating in the device and adjustment of the mercury vapor pressure by heating the cooled air in a heating device and the heating of a cecum shaped piece of tubing with this heated air. In order to reduce the energy consumption during this heating phase, a mechanism is provided in the device in order to lead a first portion of the cooled air flow directly to the discharge tube of the lamp. A second portion of the cooled air flow, which is smaller in comparison with the first portion, is heated by the heating device and let to the cecum.

The above patented invention differs from the present invention because the UV lighting system lacks a baffle, lacks addition of hydrogen peroxide, lacks an indicator and the entire system lacks an ozonator.

In U.S. Pat. No. 5,364,537, dated, Nov. 15, 1994, titled, PROCESS FOR THE OXIDATION OF ORGANIC MICROPOLLUTANTS IN WATER USING THE O3/H2O2 COMBINATION, invented by Paillard, comprises a process and device for combined oxidation of polluted water, e.g. industrial waste water or effluents, to make it suitable for drinking, involves injection of hydrogen peroxide (pure aqueous solution or diluted) and ozone (gaseous, or ozonized oxygen or air) simultaneously and in a flow direction co current with the circulation of the water to be treated, at the inlet of the oxidation reactor. For example, a reactor is endowed with mechanisms to inject ozone and hydrogen peroxide at its base, at very closely spaced points and simultaneously, in a flow direction the same as the water to be treated, with an automatic control system to regulate the levels of the oxidizing agents.

The above patented invention differs from the present invention because it lacks an UV lighting system and lacks an indicator.

In U.S. Pat. No. 4,983,307, dated, Jan. 8, 1991, titled, METHOD FOR STERILIZING LIQUIDS BY ULTRVIOLET RADIATION invented by Nesathurai, comprises a process and apparatus for reducing the dissemination of aquatic organisms and decreasing the risk of diseases caused by fungi, such as Pythium and Phythophthora spp, in greenhouse plants grown hydroponically by Nutrient Film Technique (NFT) by treating the water to be used in the NFT with ultraviolet radiation at a wave length of 2537 A by passing the water in a zone of restricted width adjacent and exposed to the source of ultraviolet radiation and maintaining the temperature of the water in the range of 15° C. to 26° C. as it is passed at the zone. The apparatus includes an elongated cylindrical housing including a top cap and a bottom cap sealingly closing the cylindrical housing. A water inlet is located on the cyulindrical housing near the bottom end cap and water outlet on the cylindrical housing near the top cap. An ultraviolet lamp in the form of an elongated cylindrical member extends concentrically within the housing and through the top cap and bottom cap. The top cap and bottom cap are removably secured to the cylindrical housing for access to the lamp and the interior of the housing.

The above patented invention differs from the present invention because the UV lighting system lacks a baffle, lacks addition of hydrogen peroxide, lacks an indicator and the entire system lacks an ozonator.

In U.S. Pat. No. 5,290,439, dated, Mar. 1, 1994, titled, DEVICE FOR PURIFYING A FLOW OF LIQUID BY MEANS OF ULTRVIOLET RADIATION invented by Buchwald, comprises a device for purifying a flow of liquid by means of ultraviolet radiation, includes an elongated ultraviolet lamp; a generally tubular inner casing surrounding substantially the lamp, the casing being made of a material that allows transmission of utraviolet radiation, the casing having an aperture at each end thereof from which the electrical terminals of the lamp protrude; and a generally tubular outer casing surrounding the inner casing and forming with it a flow passage, the outer casinga being provided at substantially each of its ends with inlet and outlet for the flow of liquid. Two connectors are disposed respectively at both ends of the device for securing the lamp and the inner casing with respect to the outer casing. Each connector includes an annular liquid tight removable seal disposed between inner and outer casings; an opaque electrical socket having a central cavity for receiving the corresponding terminal of the lamp; and a fixing device for securing the corresponding socket and seal with respect to said casings and lamp.

The above patented invention differs from the present invention because the UV lighting system lacks a baffle, lacks addition of hydrogen peroxide, lacks an indicator and the entire system lacks an ozonator.

In U.S. Pat. No. 5,273,664, dated, Dec. 28, 1993, titled, APPARATUS AND METHOD FOR DISINFECTION OF WATER BY OZONE INJECTION invented by Schulz, comprises an apparatus and a method for disinfecting water by contacting the water with gaseous ozone. The device includes a series of treatment chambers that are interconnected serially by external transfer conduits, each transfer conduit including an introduction tap for introducing ozonated water into the water to be treated. The treated water flows swquentially from one chamber into the next. Hydrogen peroxide is added to the water as it enters a final chamber for final degasification of the water. Within each treatment chamber a mixing chamber is provided for additional intermixing and greater mass transfer of ozone with the water by alternately speeding up and slowing down the flow of the ozone water mixture before the mixture is introduced downwardly into the respective chamber adjacent the lower wall thereof. An educator and static mixer are provided to entrain and mix pzpne and water to provide a side stream of ozonated water for each of the several treatment chamber transfer conduits, and flow control valves are provided to permit regulation of the rate of flow of ozonated water for maximum desired dissinfection. In another embodiment, direct diffusion of ozone into water flowing within the transfer conduits is effected by passing the ozone into ceramic, rod type diffuser elements positioned within the conduits.

The above patented invention differs from the present invention because the syaytem lacks an UV lighting system with a baffle, and lacks an indicator.

In U.S. Pat. No. 4,156,652, dated, May 29, 1979, titled APPARATUS FOR STERILIZING FLUIDS WITH UV RADIATION AND OZONE invented by Weist, comprises an apparatus for sterilizing fluids comprises a radiation chamber which comprises a source of ultraviolet radiation; a housing surrounding said source and including an inner casing permeable to utraviolet radiation and bouding a channel with said source, and an outer casing surrounding said inner casing and forming a treating space therewith; a conduit for conducting a stream of gas containing molecular oxygen through said channel for exposure to said ultraviolet radiation to produce an ozone enriched gas; a conduit for conducting a fluid through said treating space so as to become sterilized by the ultraviolet radiation; and a conduit for introducing at least a portion of said ozone enriched gas from said channel into said treating space to become united with said fluid, whereby said introduced portion of ozone enriched gas is again exposed to utraviolet radiation in order to produce an increased content of ozone in said ozone enriched gas and an additional sterilizing effect is produced in said fluid. A process for sterilizing fliuid is also provided. According to this process, a fluid and a gas wwhich contains molecular oxygen are irradiated with ultraviolet radiation and are then mixed together in order to produce an additional sterilizing effect.

The above patented invention differs from the present invention because the UV lighting system lacks a baffle, lacks addition of hydrogen peroxide, lacks an indicator and the entire system lacks an ozonator.

In U.S. Pat. No. 5,256,299, dated, Oct. 26, 1993, titled, METHOD AND APPARATUS FOR LIQUID TREATMENT invented by Wang et al., comprises an improved method and apparatus for purifying liquid in a square or reactangular tank involving ultr violet (UV) treatment, oxidation, flotation, filtratin, effluent purging and disinfection is described. The liquid to be treated is fed into the mixing chamber of the apparatus in the presence of UV light and anoxident (ozone and/or hydrogen peroxide), and then discharged into the flotation chamber for gas stripping of volatile organic compounds (VOC) and flotation removal of floting substances. The subnatant in flotation chamber flows downward through multiple automatic backwash liquid phase granular activated carbon (GAC) filters for final polishing before being discharged as the liquid effluent or further disinfected. The flotation chamber is hooded for collection of gas stream which is moved by a gas mover and purified by a gas phase granular activated carbon (GAC) filter. The gas effluent from said gas phase GAC filter is recycled to said flotation chamber for reproduction of gas bubbles, and elimination of secondary air pollution. The multiple liquid phase GAC filters when dirty are backwashed by backwash means comprising a backwash hood, mechanical gears, backwash pump(s) using clean water. The dirty backwash wastewater is recycled to the indake header for water treatment thus eliminating secondary water pollution. The floating substances on the liquid surface of said flotation chamber are skimmed off by a removal mechanism for disposal as the waste sludge. The liquid phase GAC when its regeneration is due is pumped out from a liquid phase GAC filter as a slurry by said backwash pump(s) and is separated by a solid-liquid separator for regeneration. A built in purge system recycles a portion of said liquid phase GAC filter effluent for repeated treatment during filter backwash, thus upgrading the effluent quality.

The above patented invention differs from the present invention because the UV lighting system lacks a baffle, lacks an indicator and the entire system lacks an ozonator.

In U.S. Pat. No. Des. 350,181, dated, Aug. 30, 1994, titled, ULTRAVIOLET WATER STERILIZER FOR HOT TUBS, SWIMMING POOLS AND SPAS invented by MacNeal, comprises the ornimental design for an ultraviolet water sterilizer for hot tubs, swimming pools.

The above patented invention differs from the present invention because the UV lighting system lacks a baffle, lacks addition of hydrogen peroxide, lacks an indicator and the entire system lacks an ozonator.

Numerous innovations for water purifying systems have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a water purifying system utilizing a combination of well known devices in the art such as UV light, ozonator and addition of hydrogen perozide in combination with a novel baffling system contained within the UV lighting system. In conjunction and/or separately utilizing the novel UV light baffle system, increased kill rate is achieved upon the microorgarnisms present in the water. Thus, increasing the overall disinfecting ability of the system.

The types of problems encountered in the prior art are UV lighting systems lacking a baffle are much less microorganism disinfecting efficient than then the UV light baffled system.

In the prior art, unsuccessful attempts to solve this problem were attempted namely: UV lighting system alone, UV lighting systems with addion of hydrogen peroxide, ozone system alone, ozone system with addition of hydrogen peroxide, and a combination of UV light and ozonator. However, the problem was solved by the present invention because the UV lighting system baffle increased direct exposure of the microorganisms to direct UV light as well as closer direct exposure of the hydrogen peroxide molecules to the UV light thereby increasing ozone production.

Innovations within the prior art are rapidly being exploited in the field of water purification utilizing UV lights and ozonators.

The present invention went contrary to the teaching of the art which described combinations of mechanical ozone producing apparatuses such as UV light and/or ozonators with or without addition of hydrogen peroxide but the prior art lacked an improved UV lighting system.

The present invention solved a long felt need to increase disinfecting capability of a water purifying system.

The inventor of the present invention experienced a great deal of commercial success in the U.S. namely: selling thousand of the combination water purification system consisting of UV light with baffle, ozonator, additional hydrogen peroxide and indicating means.

The present invention produced unexpected results namely:overall efficiency was increased with the use of the indicating system which notifies a user when to replace the UV lighting system due to mineral build up and/or UV light eminition deficiency.

A synergistic effect was produced utilizing the present invention due to the following facts and results from experimentation: between the UV light with baffle and the ozonator in the presence of hydrogen peroxide.

Accordingly, it is an object of the present invention to provide a water purification system.

More particularly, it is an object of the present invention to provide an improved ultra violet lighting means.

In keeping with these objects, and with others which will become apparent hereinafter, one feature of the present invention resides, briefly stated, in the improved ultra violet lighting means having an ultra violet lighting means baffle.

When the water purifying system is designed in accordance with the present invention, the ultra violet lighting means baffle has a plurality of ultra violet lighting means baffle ridges and a plurality of ultra violet lighting means baffle grooves in a rifled spiraling configuration.

In accordance with another feature of the present invention, an ultra violet lighting means indicator is utilized to notify the user when the UV lighting system becomes inefficient.

Another feature of the present invention is that it utilizes an ozonator.

Yet another feature of the present invention is that it utilizes addition of hydrogen peroxide which increases ozone production.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

DETAILED DESCRIPTION OF THE PREFERRED EMBODIMENT

Figure 1A:
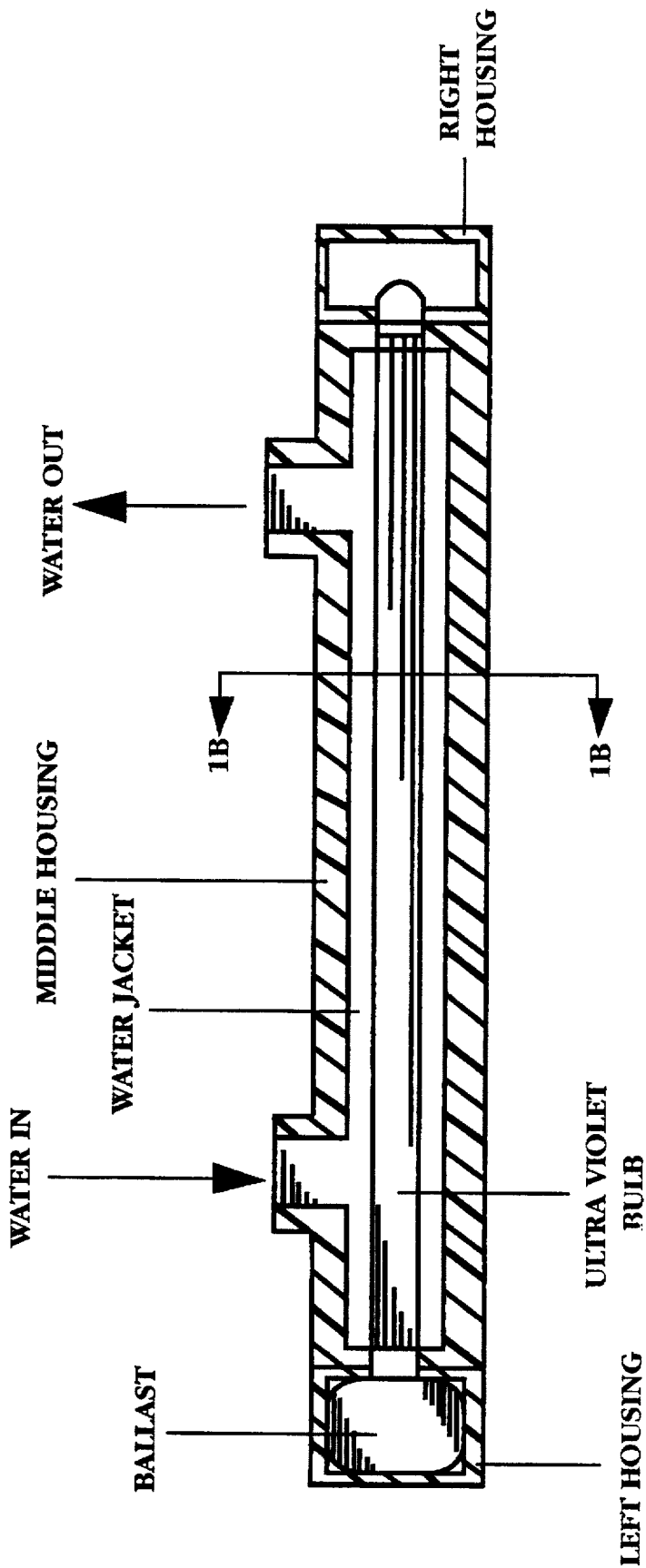
FIG. 1A is a longitudinal cross sectional view of a prior art ultra violet lighting means without an ultra violet lighting means baffle.
Figure 1B:
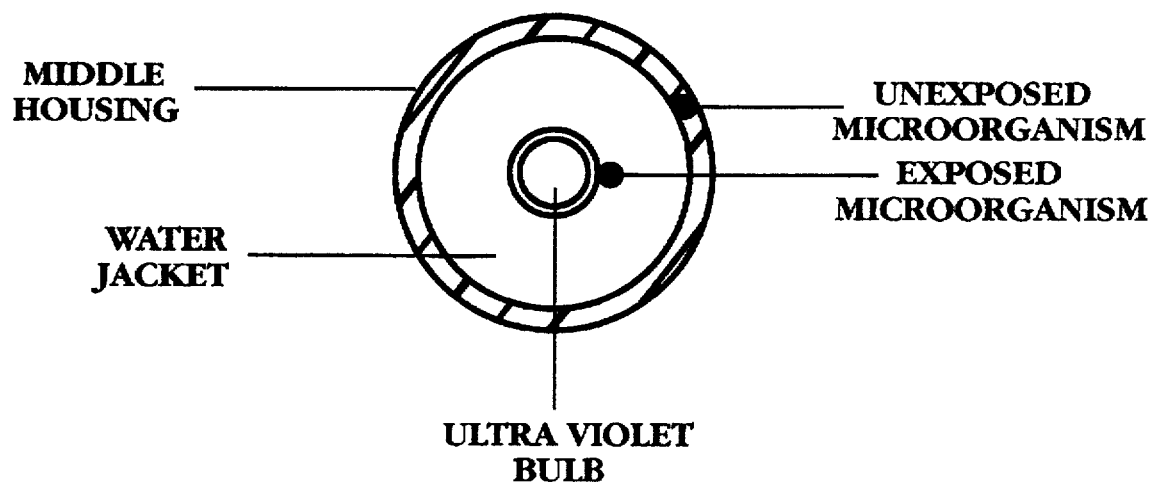
FIG. 1B is a cross sectional view along line 1B—1B of FIG. 1A of a prior art ultra violet lighting means without an ultra violet lighting means baffle.

Firstly, referring to FIG. 1A and FIG. 1B which are a longitudinal cross sectional view of a prior art ultra violet lighting means without an ultra violet lighting means baffle and a cross sectional view along line 1B—1B of FIG. 1A of a prior art ultra violet lighting means without an ultra violet lighting means baffle, respectively. The prior art ultra violet lighting means has an ultra violet lighting means water ingress, an ultra violet lighting means water egress, an ultra violet lighting means water jacket, an ultra violet lighting means left housing, an ultra violet lighting means right housing, an ultra violet lighting means middle housing, an ultra violet lighting means ballast, and an ultra violet lighting means bulb. Water from a water reservoir which is usually a hot tub and/or pool is pumped through the prior art ultra violet lighting means entering the ultra violet lighting means water ingress and exiting the ultra violet lighting means water egress. While the water is within the ultra violet lighting means middle housing it form an ultra violet lighting means water jacket which surrounds the ultra violet lighting means bulb. Microorganisms such as bacteria, fungi, and viruses which are present in the water reservoir and hence pumped through the ultra violet lighting means are also present in the ultra violet lighting means water jacket. The microorganisms present in the ultra violet lighting means water jacket which come in close proximity to the ultra violet lighting means bulb are killed but the microorganisms present in the ultra violet lighting means water jacket which do not come in close proximity to the ultra violet lighting means bulb survive. The resident time the microorganisms present in the ultra violet lighting means water jacket being directly exposed to the ultra violet lighting means bulb in close proximity determines the kill rate of the microorganisms. Hence, a long exposure time of the microorganisms within the ultra violet lighting means water jacket would result in an approximate 99.9% kill rate. Unfortunately, since a standard hot tub and/or pool pump pushes water at a rate exceeding 10 gallons per minute, the amount of exposure time a microorganism within the ultra violet lighting means water jacket comes in direct contact with rays emanating from the ultra violet lighting means bulb is only a few seconds. Therefore, the kill rate is minimal at best being approximately 1–2%. Due to the configuration of the prior art ultra violet lighting means, unexposed microorganisms easily flow in a laminar fashion in close proximity to the middle housing where as exposed microorganisms flow in a laminar fashion in close proximity to the ultra violet lighting means bulb. Therefore, there existed a need to change the configuration of the ultra violet lighting means to alter the laminar flow of water therein to maximally expose microorganisms to the ultra violet lighting means bulb resulting in maximum kill rate for the specific time period that the microorganisms remained within the ultra violet lighting means water jacket. In addition, since minerals are often contained within the water, they constantly build up on the ultra violet lighting means bulb making it more inefficient as time goes on. Unfortunately, most ultra violet lighting means are enclosed in a housing that prevents light from being emitted due to the danger of exposure of ultra violet to a human's eye (retina). Subsequently, there existed a need to have an indicating means whereby light emission is measured to indicate inefficiency and need of replacement.

Figure 2A:
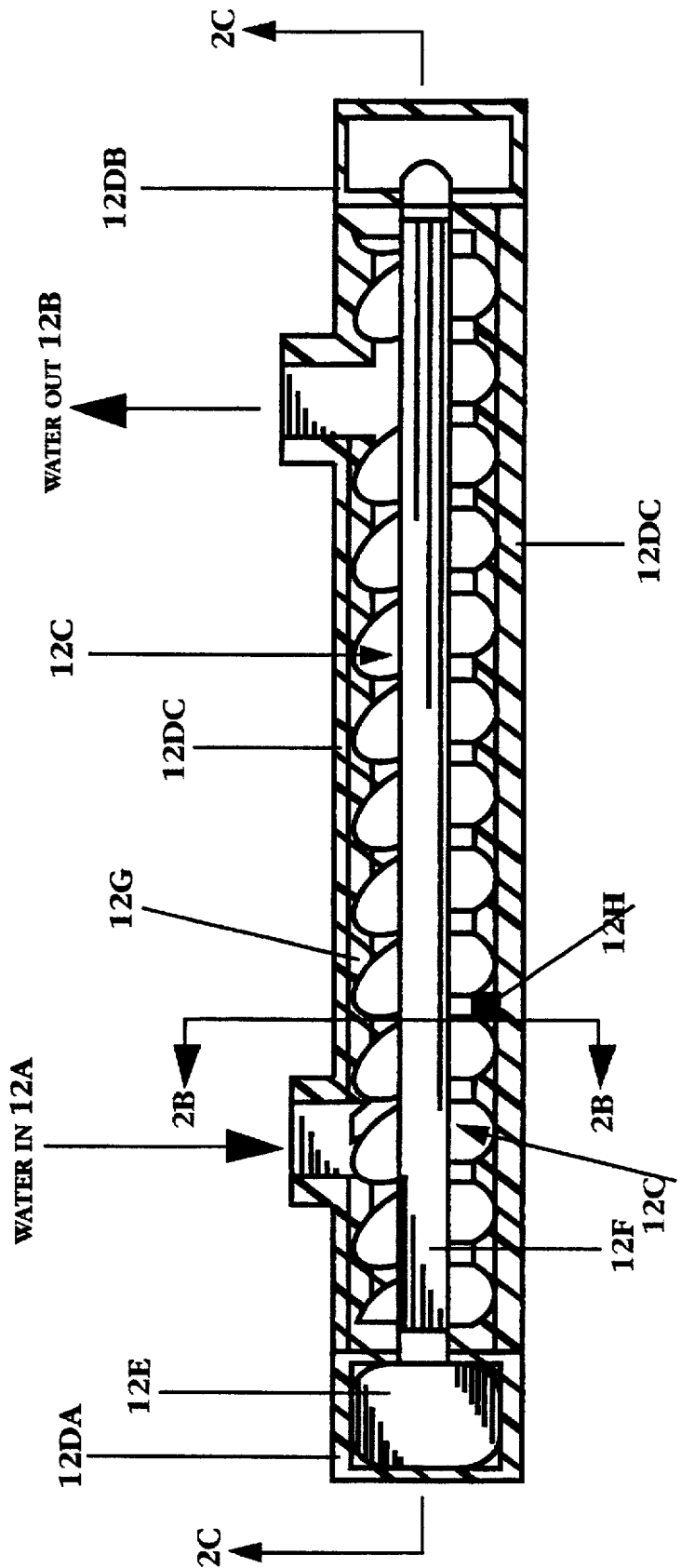
FIG. 2A is a longitudinal cross sectional view of a ultra violet lighting means with an ultra violet lighting means baffle.

Referring now to FIG. 2A which is a longitudinal cross sectional view of an ultra violet lighting means (12) with an ultra violet lighting means baffle (12G). The ultra violet lighting means (12) has an ultra violet lighting means water ingress (12A) preferably positioned at one distal end of an ultra violet lighting means middle housing (12DC) and an ultra violet lighting means water egress (12B) preferably positioned at an opposite distal end of an ultra violet lighting means middle housing (12DC). Contained within the ultra violet lighting means middle housing (12DC) is an ultra violet lighting means bulb (12F) which is waterproofingly sealed against the ultra violet lighting means middle housing (12DC) on a left distal end to an ultra violet lighting means left housing (12DA) and is waterproofingly sealed against the ultra violet lighting means middle housing (12DC) on a right distal end to an ultra violet lighting means right housing (12DB) to prevent water escaping therefrom. The ultra violet lighting means bulb (12F) is electrically connected to an ultra violet lighting means ballast (12E) for power. The ultra violet lighting means ballast (12E) is electrically connected to a power means such as 110 AC or 220 AC. Contained within and extending therethrough the ultra violet lighting means middle housing (12DC) is a ultra violet lighting means baffle (12G) which has openings corresponding to the ultra violet lighting means water ingress (12A) and ultra violet lighting means water egress (12B) permitting water from the water reservoir (22) to enter therein and exit therefrom. The ultra violet lighting means baffle (12G) has a plurality of ultra violet lighting means baffle ridge (12GA) and a plurality of ultra violet lighting means baffle grooves (12GB) in an alternating configuration. The alternating configuration of the plurality of ultra violet lighting means baffle ridge (12GA) and plurality of ultra violet lighting means baffle grooves (12GB) is preferably in a spiral (rifled) configuration. However, the alternating configuration of the plurality of ultra violet lighting means baffle ridge (12GA) and plurality of ultra violet lighting means baffle grooves (12GB) can alternatively be in a ring configuration wherein the rings are perpendicular to the longitudinal plane of the ultra violet lighting means middle housing (12DC). A combination of ring and spiral configurations could also be utilized in still another alternate embodiment. An ultra violet lighting means indicator (12H) is preferably positioned between an interior of the ultra violet lighting means middle housing (12DC) and an exterior of the ultra violet lighting means baffle (12G) within an ultra violet lighting means baffle groove (12GB). The ultra violet lighting means baffle (12G) is preferably manufactured from transparent and/or translucent material to allow ultra violet light emitted from the ultra violet lighting means bulb (12F) through the ultra violet lighting means baffle (12G) and onto the ultra violet lighting means. indicator (12H) to measure the efficiency of the ultra violet lighting means bulb (12F). The transparent and/or translucent material can be glass, plastic, plastic composites, rubber, rubber composites, fiberglass and/or epoxy.

Figure 2B:
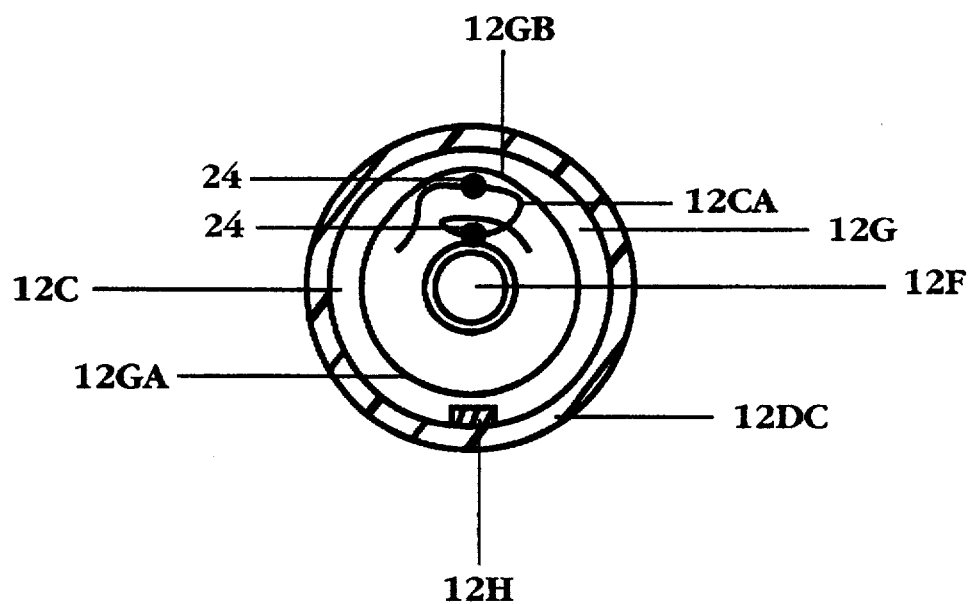
FIG. 2B is a cross sectional view along line 2B—2B of FIG. 2A of an ultra violet lighting means with an ultra violet lighting means baffle and an ultra violet lighting means indicator.

Referring now to FIG. 2B which is a cross sectional view along line 2B—2B of FIG. 2A of an ultra violet lighting means with an ultra violet lighting means baffle and an ultra violet lighting means indicator (12H). The ultra violet lighting means indicator (12H) is preferably positioned between an interior of the ultra violet lighting means middle housing (12DC) and an exterior of the ultra violet lighting means baffle (12G) within an ultra violet lighting means baffle groove (12GB). Then mineral deposits build up on the ultra violet lighting means bulb (12F) through normal use, the ultra violet lighting means indicator (122H) alerts the user that it is time to change the ultra violet lighting means bulb (12F). Notice the ultra violet lighting means water jacket laminar flow (12CA) which a microorganism (24) is forced to be exposed in close proximity to the ultra violet lighting means bulb (12F) functioning to increase kill rate.

Figure 2C:
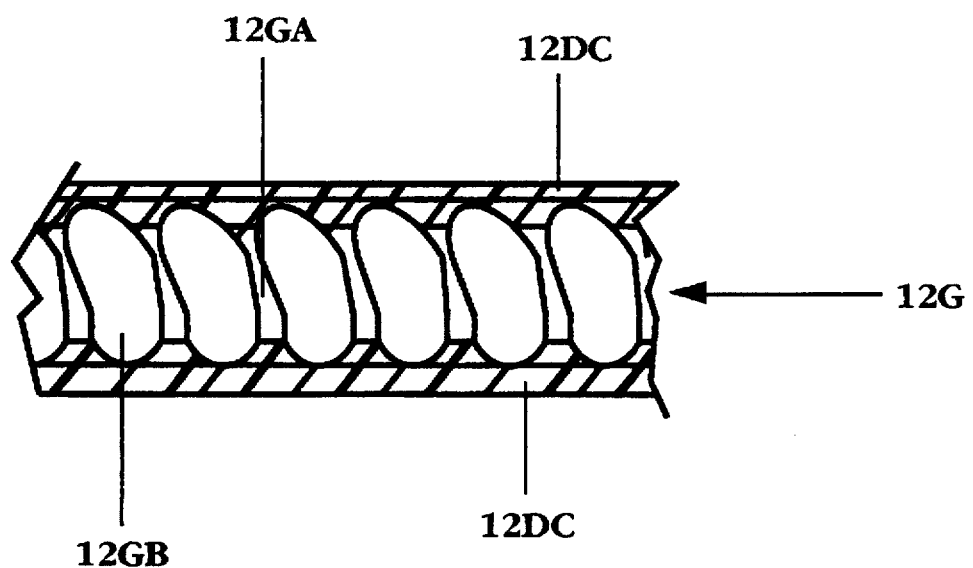
FIG. 2C is a longitudinal cross sectional view along line 2C—2C of FIG. 2A of an ultra violet lighting means baffle exhibiting ultra violet lighting means baffle ridges and ultra violet lighting means baffle grooves.

Referring to FIG. 2C which is a longitudinal cross sectional view along line 2C—2C of FIG. 2A of an ultra violet lighting means baffle (12G) exhibiting a plurality of ultra violet lighting means baffle ridges (12GA) and a plurality of ultra violet lighting means baffle grooves (12GB) arranged in an alternating spiraling (rifled) configuration. The spiraled configuration is preferred since it disrupts the laminar flow of water maximally exposing the microorganisms (24) without cavitation being caused as is present in a ringed alternative embodiment.

Figure 3:
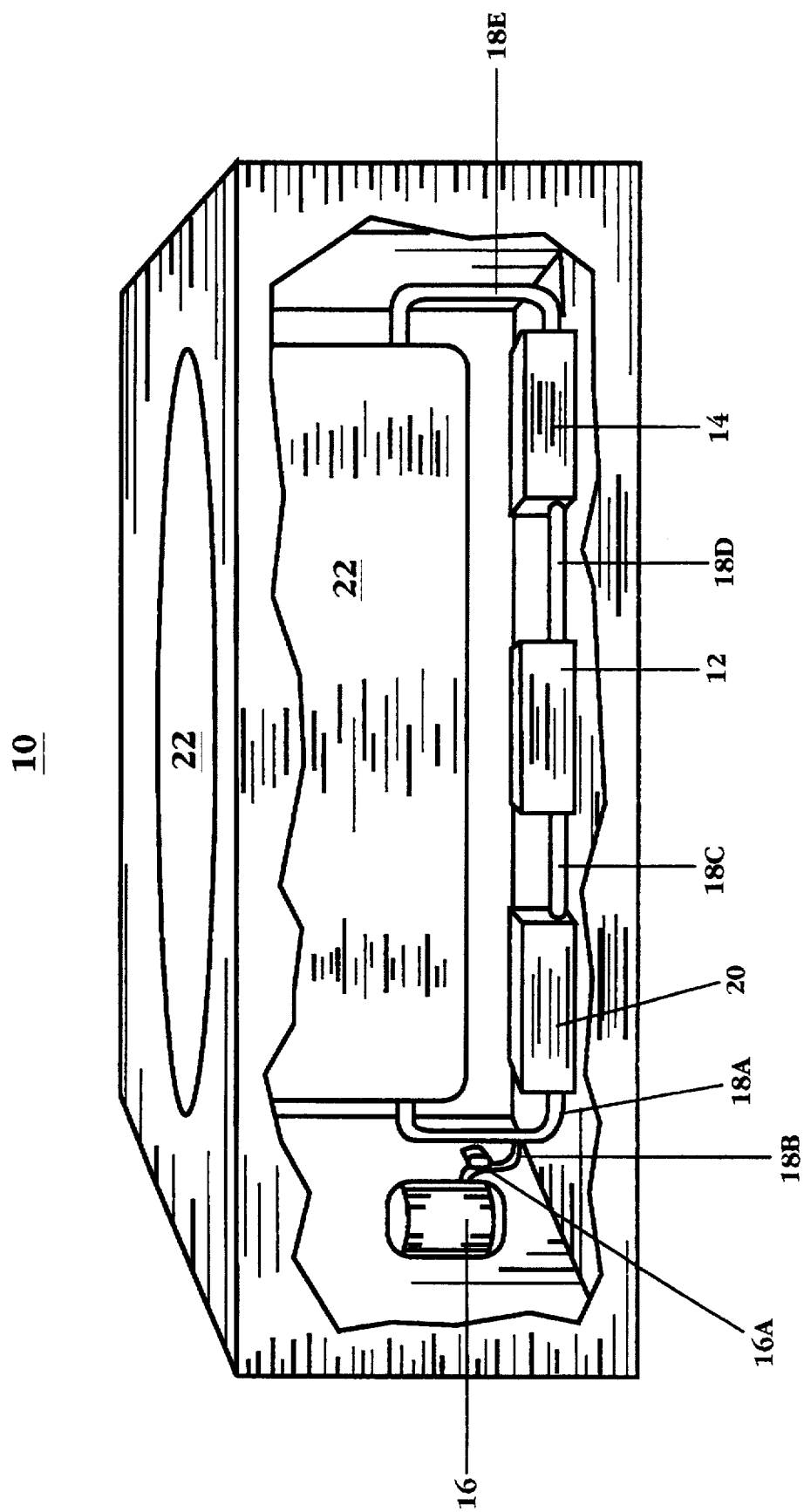
FIG. 3 is a perspective partial cut away view of a water purifying system.

Lastly, referring to FIG. 3 which is a perspective partial cut away view of a water purifying system (10). A water reservoir (22) has an outlet connected to a first water line (18A) at one distal end. The first water line (18A) is connected to a water pump (20) at an opposite distal end. Within the first water line (18A), a second water line (18B) is spliced therein. The second water line (18B) is connected to a hydrogen peroxide container pump (16A) which in turn is connected to a hydrogen peroxide container (16). The hydrogen peroxide container pump (16A) functions to pump a metered amount of hydrogen peroxide from the hydrogen peroxide container (16) to the first water line (18A) via the second water line (18B). The hydrogen peroxide is then circulated throughout the water purifying system (10) by the water pump (20). The water pump (20) is connected to the ultra violet lighting means (12) by a third water line (18C). Within the ultra violet lighting means (12), hydrogen peroxide is converted to ozone (03) and water ($H_2O$) in accord with the following formula:

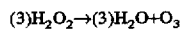

The ultra violet lighting means (12) is connected to the ozonator (14) via a forth water line (18D). the ozonator (14) is connected to an ingress connection of the water reservoir (22) by a fifth water line (18E).

The ozonator (14) functions via electrical shock to fractionate oxygen ($O_2$) into free radical oxygen (O) and thereafter the free radical oxygen (O) combine with each other under the electrical shock to for ozone ($O_3$) in accord with the following formula:

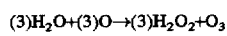

The conjunction of the ozonator (14) and the ultra violet lighting means (12) maximize the production of ozone ($O_3$) which is an unstable and transient molecule which functions and a biocidal anti-microbial means killing bacteria, viruses and fungi. Therefore, the water purifying system (10) utilizing an conjunction of the ozonator (14) and the ultra violet lighting means (12) in the presence of added hydrogen peroxide yields maximum ozone production and hence, maximal antimicrobial properties. Both the ozonator (14) or the ultra violet lighting means (12) utilized individually without hydrogen peroxide function as an biocidal anti-microbial means by producing ozone or disrupting DNA (RNA) of the microorganism (24). However the biocidal anti-microbial properties are not as great as if either the ozonator (14) or the ultra violet lighting means (12) are utilized in the presence of hydrogen peroxide. In addition, the ozonator (14) or the ultra violet lighting means (12) utilized individually does not yield maximal biocidal anti-microbial properties as found in the conjunction of both the the ozonator (14) and the ultra violet lighting means (12) are utilized in the presence of hydrogen peroxide.

It will be understood that each of the elements described above, or two or more together, may also find a useful application in other types of constructions differing from the type described above.

While the invention has been illustrated and described as embodied in a water purifying system. it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A water purifying system (10) comprising:

A) An ultra violet lighting means (12) which comprises an ultra violet lighting means middle housing (12DC)

having an ultra violet lighting means left housing (12DA) sealably attached at a left distal end and an ultra violet lighting means right housing (12DB) sealably attached at a right distal end, the ultra violet lighting means middle housing (12DC) further comprising an ultra violet lighting means water ingress (12A) and an ultra violet lighting means water egress (12B) positioned at opposite distal ends thereof, an ultra violet lighting means bulb (12F) axially positioned in a center and contained therein, and an ultra violet lighting means baffle (12G) longitudinally disposed therein forming an ultra violet lighting means water jacket (12C) between the ultra violet lighting means bulb (12F) aid the ultra violet lighting means baffle (12G); the ultra violet lighting means baffle (12G) being circumferentially positioned on and sealably attached to and extending inwardly from an interior surface of the ultra violet lighting means middle housing (12DC) and comprising a plurality of alternating ultra violet lighting means baffle ridges (12GA) and grooves (12GB), and being (12G) manufactured from a transparent or translucent material; the lighting means middle housing (12DC) further comprising an ultra violet lighting means indicator (12H) contained therein, wherein the ultra violet lighting means baffle ridges (12GA) extend inwardly to a mid-point between the ultra violet lighting means middle housing (12DC) and the ultra violet lighting means bulb (12F); and wherein the plurality of ultra violet lighting means baffle ridges (12GA) and grooves (12GB) are configured in a corkscrew rifled configuration or a multiple ring configuration;

B) an ozonator (14) having an inlet connected to the egress of the ultra violet lighting means (12) and having an outlet connected to a water reservoir (22);

C) a water pump (20) having an inlet connected to an outlet of the water reservoir (22) by a first water line (18A) and having an outlet connected to the ultra violet lighting means ingress; and D) a hydrogen peroxide container (16) connected to the first water line by a second water line (18B) having a hydrogen peroxide container pump (16A) forming means to add a predetermined amount of hydrogen peroxide from the hydrogen peroxide container (16) to the water purifying system (10).

2. The water purifying system (10) as described in claim 1, wherein the ultra violet lighting means baffle (12G) is manufactured from a material selected form a group of materials consisting of plastic, plastic composites, rubber, rubber composites, epoxy, fiberglass and glass.

3. The water purifying system (10) as described in claim 1, wherein the ultra violet lighting means bulb (12F) is a incandescent bulb.

4. The water purifying system (10) as described in claim 1, wherein the ultra violet lighting means bulb (12F) is a fluorescent bulb.

5. The water purifying system (10) as described in claim 4, wherein the fluorescent bulb is energized by an ultra violet lighting means ballast (12E) positioned within the ultra violet lighting means left housing (12DA).

6. The water purifying system (10) as described in claim 1, wherein the ultra violet lighting means indicator (12H) is positioned between the ultra violet lighting means baffle (12G) and the ultra violet lighting means middle housing (12DC).

* * * * *